United States Patent
Palmeri et al.

(10) Patent No.: US 7,590,685 B2
(45) Date of Patent: Sep. 15, 2009

(54) TECHNIQUES FOR PROVIDING INTEROPERABILITY AS A SERVICE

(75) Inventors: Ron Palmeri, Berkeley, CA (US); David Byrne Reese, Oakland, CA (US)

(73) Assignee: Salesforce.com Inc., San Francisco, CA (US)

( * ) Notice: Subject to any disclaimer, the term of this patent is extended or adjusted under 35 U.S.C. 154(b) by 965 days.

(21) Appl. No.: 10/820,650

(22) Filed: Apr. 7, 2004

(65) Prior Publication Data

US 2005/0228863 A1    Oct. 13, 2005

(51) Int. Cl.
*G06F 13/00* (2006.01)

(52) U.S. Cl. ....................................... 709/203

(58) Field of Classification Search ............... 709/205, 709/203

See application file for complete search history.

(56) References Cited

U.S. PATENT DOCUMENTS

| | | |
|---|---|---|
| 5,119,377 A | 6/1992 | Cobb et al. |
| 5,222,234 A | 6/1993 | Wang et al. |
| 5,255,389 A | 10/1993 | Wang |
| 5,333,312 A | 7/1994 | Wang |
| 5,446,903 A | 8/1995 | Abraham et al. |
| 5,850,518 A | 12/1998 | Northrup ............... 395/200.33 |
| 5,903,652 A | 5/1999 | Mital |
| 5,917,489 A | 6/1999 | Thurlow et al. |
| 6,032,118 A | 2/2000 | Tello et al. |
| 6,055,513 A | 4/2000 | Katz et al. |
| 6,065,082 A | 5/2000 | Blair et al. |
| 6,073,142 A | 6/2000 | Geiger et al. |
| 6,091,714 A | 7/2000 | Sensel et al. |
| 6,105,027 A | 8/2000 | Schneider et al. |
| 6,115,690 A | 9/2000 | Wong |
| 6,138,158 A | 10/2000 | Boyle et al. |
| 6,148,411 A | 11/2000 | Ichinohe et al. |
| 6,178,505 B1 | 1/2001 | Schneider et al. |
| 6,226,623 B1 | 5/2001 | Schein et al. |
| 6,230,203 B1 | 5/2001 | Koperda et al. |
| 6,233,565 B1 | 5/2001 | Lewis et al. |
| 6,247,057 B1 | 6/2001 | Barrera, III |
| 6,256,667 B1 | 7/2001 | Wanghlander et al. |
| 6,260,062 B1 | 7/2001 | Davis et al. |
| 6,292,789 B1 | 9/2001 | Schutzer |
| 6,304,969 B1 | 10/2001 | Wasserman et al. |
| 6,332,163 B1 | 12/2001 | Bowman-Amuah |
| 6,336,135 B1 | 1/2002 | Niblett et al. |

(Continued)

OTHER PUBLICATIONS

"Coblist: -Cob: Welcome to my photo album!," Sep. 2000.
"Evite.com launches Free web based group activity organizer," PR Newswire, Jul. 1999.
"Evite Relies on MySQL to Deliver Millions of Invitations," Morelock.
"Evite Tour," Evite, Mar. 2001.
Excite@Home Excites #1 webshots provides users with comprehensive photo capabilities; unveiling "My Photos wherein excite uses can create personal albums, share photos, search photos and order quality prints by Ofoto," Jorgensen, Mr Presswire, Jun. 200.

(Continued)

*Primary Examiner*—Robert B Harrell
(74) *Attorney, Agent, or Firm*—Weaver Austin Villeneuve & Sampson LLP

(57) ABSTRACT

An interoperability system provides highly individualized, on-demand access to a plurality of services by a plurality of users. Each of the plurality of users is associated with one of a plurality of independent enterprises, and the plurality of services are associated with and controlled by a plurality of independent service providers. A directory maps an identity corresponding to each of the users to a policy framework which defines access policies relating to the services. The system can connect with each of the clients and each of the services, and facilitate interaction among the client machines and the services with reference to the directory and the policy framework.

42 Claims, 8 Drawing Sheets

U.S. PATENT DOCUMENTS

| | | | |
|---|---|---|---|
| 6,338,050 B1 | 1/2002 | Conklin et al. | |
| 6,351,739 B1 | 2/2002 | Egendorf | |
| 6,397,197 B1 | 5/2002 | Gindlesperger | |
| 6,397,254 B1 | 5/2002 | Northrup | 709/227 |
| 6,421,705 B1 | 7/2002 | Northrup | 709/203 |
| 6,438,594 B1 | 8/2002 | Bowman-Amuah | |
| 6,446,069 B1 | 9/2002 | Yaung et al. | |
| 6,449,634 B1 | 9/2002 | Capiel | |
| 6,470,357 B1 | 10/2002 | Garcia, Jr. et al. | |
| 6,470,385 B1 | 10/2002 | Nakashima et al. | |
| 6,493,758 B1* | 12/2002 | McLain | 709/227 |
| 6,499,108 B1 | 12/2002 | Johnson | |
| 6,526,044 B1 | 2/2003 | Cookmeyer et al. | |
| 6,529,489 B1 | 3/2003 | Kikuchi et al. | |
| 6,546,413 B1 | 4/2003 | Northrup | 709/200 |
| 6,549,944 B1 | 4/2003 | Weinberg et al. | |
| 6,587,466 B1 | 7/2003 | Bhattacharya et al. | |
| 6,587,838 B1 | 7/2003 | Esposito et al. | |
| 6,601,082 B1 | 7/2003 | Durham et al. | |
| 6,618,749 B1 | 9/2003 | Saito et al. | |
| 6,633,630 B1 | 10/2003 | Owens et al. | |
| 6,651,087 B1 | 11/2003 | Dennis | |
| 6,671,713 B2 | 12/2003 | Northrup | |
| 6,671,716 B1 | 12/2003 | Diedrichsen et al. | 709/203 |
| 6,671,746 B1 | 12/2003 | Northrup | 712/200 |
| 6,704,768 B1 | 3/2004 | Zombek et al. | |
| 6,714,987 B1 | 3/2004 | Amin et al. | |
| 6,718,380 B1 | 4/2004 | Mohaban et al. | |
| 6,721,747 B2 | 4/2004 | Lipkin | |
| 6,735,621 B1 | 5/2004 | Yoakum et al. | |
| 6,763,104 B1 | 7/2004 | Judkins et al. | |
| 6,813,278 B1 | 11/2004 | Swartz et al. | |
| 6,850,893 B2 | 2/2005 | Lipkin et al. | |
| 6,857,072 B1 | 2/2005 | Schuster et al. | |
| 6,871,231 B2 | 3/2005 | Morris | |
| 6,877,023 B1 | 4/2005 | Maffeis et al. | |
| 6,886,026 B1 | 4/2005 | Hanson | |
| 6,917,962 B1 | 7/2005 | Cannata et al. | |
| 6,925,488 B2 | 8/2005 | Bantz et al. | |
| 6,934,532 B2 | 8/2005 | Coppinger et al. | |
| 6,948,063 B1 | 9/2005 | Ganesan et al. | |
| 6,952,717 B1 | 10/2005 | Monchilovich et al. | |
| 6,957,199 B1 | 10/2005 | Fisher | |
| 6,965,878 B1 | 11/2005 | Heuring | |
| 6,990,513 B2* | 1/2006 | Belfiore et al. | 709/203 |
| 7,028,312 B1 | 4/2006 | Merrick et al. | |
| 7,035,202 B2 | 4/2006 | Callon | |
| 7,072,983 B1 | 7/2006 | Kanai et al. | |
| 7,082,532 B1* | 7/2006 | Vick et al. | 713/155 |
| 7,088,727 B1 | 8/2006 | Short et al. | |
| 7,099,950 B2 | 8/2006 | Jones et al. | |
| 7,100,195 B1 | 8/2006 | Underwood | |
| 7,107,445 B2 | 9/2006 | Trapp et al. | |
| 7,127,613 B2 | 10/2006 | Pabla et al. | |
| 7,152,204 B2 | 12/2006 | Upton | |
| 7,249,195 B2 | 7/2007 | Panec | |
| 7,305,454 B2* | 12/2007 | Reese et al. | 709/217 |
| 2001/0005358 A1 | 6/2001 | Shiozawa | |
| 2001/0029478 A1 | 10/2001 | Laster et al. | |
| 2002/0013854 A1 | 1/2002 | Eggleston et al. | |
| 2002/0019797 A1 | 2/2002 | Stewart et al. | |
| 2002/0029201 A1 | 3/2002 | Barzilai et al. | |
| 2002/0038336 A1 | 3/2002 | Abileah et al. | |
| 2002/0058277 A1 | 5/2002 | Bathe et al. | |
| 2002/0073080 A1 | 6/2002 | Lipkin | |
| 2002/0087371 A1 | 7/2002 | Abendroth | |
| 2002/0091533 A1 | 7/2002 | Ims et al. | |
| 2002/0138166 A1 | 9/2002 | Mok et al. | |
| 2002/0138389 A1 | 9/2002 | Martone et al. | |
| 2002/0143819 A1 | 10/2002 | Han et al. | |
| 2002/0161611 A1 | 10/2002 | Price et al. | |
| 2003/0018808 A1 | 1/2003 | Brouk | |
| 2003/0037250 A1 | 2/2003 | Walker et al. | |
| 2003/0041178 A1 | 2/2003 | Brouk et al. | |
| 2003/0053459 A1 | 3/2003 | Brouk | |
| 2003/0058277 A1 | 3/2003 | Bowman-Amuah | |
| 2003/0126136 A1 | 7/2003 | Omoigiu | |
| 2003/0191816 A1 | 10/2003 | Landress et al. | |
| 2004/0024896 A1 | 2/2004 | Stafford et al. | |
| 2004/0078373 A1 | 4/2004 | Ghoneimy et al. | |
| 2004/0117371 A1 | 6/2004 | Bhide et al. | |
| 2004/0167987 A1 | 8/2004 | Reese | |
| 2004/0186891 A1 | 9/2004 | Panec et al. | |
| 2004/0193606 A1 | 9/2004 | Arai et al. | |
| 2004/0243574 A1 | 12/2004 | Giroux et al. | |
| 2004/0254934 A1 | 12/2004 | Ho et al. | |
| 2005/0005164 A1 | 1/2005 | Syiek et al. | |
| 2005/0080914 A1 | 4/2005 | Lerner et al. | |
| 2005/0081066 A1 | 4/2005 | Lahdensivu et al. | |
| 2005/0086297 A1 | 4/2005 | Hinks | |
| 2005/0138031 A1 | 6/2005 | Wefers | |
| 2005/0138210 A1 | 6/2005 | Shkvarchuk | |
| 2005/0166209 A1 | 7/2005 | Merrick et al. | |
| 2005/0171930 A1 | 8/2005 | Arning et al. | |
| 2005/0223009 A1 | 10/2005 | Powers et al. | |
| 2005/0228863 A1 | 10/2005 | Palmeri et al. | |
| 2005/0234928 A1 | 10/2005 | Shkvarchuk | |
| 2005/0234964 A1 | 10/2005 | Batra et al. | |
| 2006/0015353 A1 | 1/2006 | Reese | |
| 2006/0015499 A1 | 1/2006 | Clissold et al. | |
| 2006/0031194 A1 | 2/2006 | Ghazaleh | |
| 2006/0031225 A1 | 2/2006 | Palmeri et al. | |
| 2006/0074703 A1 | 4/2006 | Bhandarkar | |
| 2006/0074915 A1 | 4/2006 | Bhandarkar | |
| 2006/0074969 A1 | 4/2006 | Barac et al. | |
| 2006/0075475 A1 | 4/2006 | Boulos | |
| 2006/0085473 A1 | 4/2006 | Thormaehlen et al. | |
| 2006/0155871 A1 | 7/2006 | Ilkka et al. | |
| 2006/0161549 A1 | 7/2006 | Bartkowiak et al. | |
| 2007/0078950 A1* | 4/2007 | Hopkins et al. | 709/217 |
| 2008/0052775 A1 | 2/2008 | Sandhu et al. | |

OTHER PUBLICATIONS

"SML: Simplifying XNL." Robert E. LaQuey, Nov. 1999.
"Trails.com Teams Up With Evite to Offer Email Trip Planning Service," Homes, 2000.
Office Action mailed Feb. 9, 2005 from U.S. Appl. No. 09/820,964.
Office Action mailed dated May 19, 2005 from U.S. Appl. No. 09/820,966.
Office Action mailed Jun. 2, 2005 from U.S. Appl. No. 10/727,089.
Office Action mailed Jun. 6, 2005 from U.S. Appl. No. 09/820,965.
Office Action mailed Jun. 6, 2005 from U.S. Appl. No. 10/728,356.
Office Action mailed Jun. 20, 2005 from U.S. Appl. No. 09/820,966.
Office Action mailed Sep. 21, 2004 from U.S. Appl. No. 10/727,089.
Office Action mailed Sep. 21, 2004 from U.S. Appl. No. 10/728,356.
Office Action mailed Sep. 28, 2005 from U.S. Appl. No. 09/820,965.
Office Action mailed Sep. 30, 2005 from U.S. Appl. No. 09/820,966.
Office Action mailed Sep. 30, 2005 from U.S. Appl. No. 10/728,356.
Office Action mailed Oct. 26, 2004 from U.S. Appl. No. 09/820,965.
Office Action mailed Nov. 28, 2005 from U.S. Appl. No. 10/727,089.
Office Action mailed Dec. 14, 2004 from U.S. Appl. No. 09/820,966.
Office Action mailed Dec. 28, 2005 from U.S. Appl. No. 09/820,964.
Greef, Arthur, "Partner Interface Process Technical Architecture", 1998, RosettaNet/PIP Technical Architecture.doc, pp. 1-12.
Stross, Kenner, "Managed B2B Infrastructure Technical Architecture", Jul. 31, 2000, Transact Technical Architecture, pp. 1-14.
"A Global Infrastructure for the Guaranteed Delivery of B2B Transactions over the Internet", 2000, Slam Dunk Networks, pp. 1-18.
ipo.com—Venture, Internet Document, URL:http://www.ipo.com/venture/pcprofile.asp?p=20323. P. 1.
CrossWeave Company, Internet Document, 2001, URL:http://www.crossweave.com/company_overview.html, P. 1.

GlueCode/Our Mission and Vision, Internet Document, URL:http://www.gluecode.com/company/mission_vision.html, P. 1.
Viquity/Press Release, "Viquity Demonstrates Power of Hub Technology In ebXML Proof-of-Concept", Dec. 12, 2000, pp. 1-2.
Festa, Paul, "Start-up gains Netscape funding, Microsoft engineers", NET News.com, Sep. 10, 2000, pp. 1-2.
Office Action dated Jun. 20, 2007, from U.S. Appl. No. 10/951,405.
IBM Technical Disclosure Bulletin, "Method of Enabling Automated Invocation of Web Services", Issue No. 455, pp. 1-6, Mar. 2002.
Newcomer, "Understanding Web Service", Addison-Wesley, Boston, pp. 1-46, 2002.
Office Action mailed Nov. 14, 2007, from U.S. Appl. No. 10/858,709.
Office Action dated Jul. 3, 2006, from U.S. Appl. No. 10/727,089.
Office Action dated Jan. 17, 2007, from U.S. Appl. No. 10/727,089.
Notice of Allowance dated Jun. 29, 2007, from U.S. Appl. No. 10/727,089.
Office Action dated May 24, 2006, from U.S. Appl. No. 10/728,356.
Notice of Allowance dated May 21, 2007, from U.S. Appl. No. 10/728,356.
Office Action dated Apr. 18, 2007, from U.S. Appl. No. 09/820,966.
Office Action dated Aug. 27, 2007, from U.S. Appl. No. 09/820,966.
Office Action mailed Jul. 13, 2005, from U.S. Appl. No. 09/820,964.
Office Action mailed Jun. 27, 2006, from U.S. Appl. No. 09/820,964.
Office Action mailed Jan. 25, 2007, from U.S. Appl. No. 09/820,964.
Office Action mailed Jul. 10, 2007, from U.S. Appl. No. 09/820,964.
Office Action dated Jun. 14, 2006, from U.S. Appl. No. 09/820,965.
Office Action dated Dec. 28, 2006, from U.S. Appl. No. 09/820,965.
Office Action dated Jul. 11, 2007, from U.S. Appl. No. 09/820,965.
Office Action dated Apr. 11, 2007, from U.S. Appl. No. 11/014,149.
Office Action dated Oct. 1, 2007, from U.S. Appl. No. 11/014,149.
US Office Action dated Aug. 4, 2008 issued in U.S. Appl. No. 10/858,709.
US Office Action Final dated Oct. 15, 2008 issued in U.S. Appl. No. 10/951,405.
US Office Action dated Mar. 26, 2008 issued in U.S. Appl. No. 10/742,513.
US Office Action dated Dec. 6, 2007 issued in U.S. Appl. No. 10/808,212.
US Office Action Final dated Aug. 7, 2008 issued in U.S. Appl. No. 10/808,212.
US Office Action dated Jul. 3, 2006 issued in U.S. Appl. No. 09/820,966.
US Office Action dated Apr. 16, 2008 issued in U.S. Appl. No. 09/820,966.
US Office Action dated Sep. 20, 2005 issued in U.S. Appl. No. 09/820,964.
US Office Action dated Nov. 20, 2006 issued in U.S. Appl. No. 09/820,964.
US Office Action dated Sep. 20, 2007 issued in U.S. Appl. No. 09/820,964.
US Office Action dated Dec. 27, 2007 issued in U.S. Appl. No. 09/820,964.
US Office Action Final dated Sep. 3, 2008 issued in U.S. Appl. No. 09/820,964.
US Examiner Interview Summary dated Oct. 9, 2007 issued in U.S. Appl. No. 09/820,965.
US Office Action dated Dec. 28, 2007 issued in U.S. Appl. No. 09/820,965.
US Notice of Allowance and Examiner's Amendment dated Sep. 8, 2008 issued in U.S. Appl. No. 09/820,965.
US Office Action dated May 14, 2008 issued in U.S. Appl. No. 11/012,639.
US Office Action Final dated Oct. 24, 2008 issued in U.S. Appl. No. 11/012,639.
US Office Action dated Apr. 11, 2007 issue din U.S. Appl. No. 11/014,149.
BizTalk Framework Overview (2000) downloaded from Biztalk.org website at http://www.biztalk.org/Biztalk/framework.asp; Retrieved from internet on Nov. 8, 2000, 3 pages.
CrossGAIN: A New Foundation for the Web (2000), overview downloaded from Crossgain.com website at http://www.crossgain.com; Retrieved from internet on Sep. 22, 2000, 1 page.

ebXML: Creating a Single Global Electronic Market (2000) OASIS UN CEFACT, copyright ebXML 2000, ebXML Technical Architecture Team, Oct. 17, 2000, 46 pages.
Gluecode™ (2000), Company overview and product guide downloaded from Glucode.com website at http://www.glucode.com; Retrieved from internet on Sep. 22, 2000, 18 pages.
Grand, Mark (1993) MIME Overview, downloaded from Mindspring.com website at http://www.mindspring.com/ mgrand/mime.html; Retrieved from internet on Mar. 1, 2001, 13 pages.
Greenbaum, Joshua (2000) "Next Generation E-Business Trading Networks: Intelligent Hubs and Viquity's Nexus Solution," Enterprise Applications Consulting, Berkeley, CA (www.eaconsult.com).
Moberg, Dale and Drummond, Rik (2005) Mime-Based Secure Peer-to-Peer Business Data Interchange Using HTTP, Applicability Statement 2 (AS2); Network Working Group, Request for Comments: 4130, Category: Standards Track, Copyright, The Internet Society, Jul. 2005.
Slam Dunk Networks (2000), Company overview and product guide downloaded from Slamdunknetworks.com website at http://www.slamdunknetworks.com; Retrieved from internet on Sep. 22, 2000, 15 pages.
Slam Dunk NetworksSM: A global Infrastructure for the Guaranteed Delivery of B2B Transactions over the Internet, Copyright 2000 Slam Dunk Networks, Inc., 19 pages.
TransactPlus Network (2000), Company overview and product guide downloaded from TransactPlus.com website at http://www.transactplus.com; Retrieved from internet on Sep. 22, 2000, 13 pages.
Viquity Dynamic Commerce Network™ (DCN) (2000), Company Overview and Service Description downloaded from Viquity.com website at http://www.viquity.com/solutions/solutions.html; Retrieved from internet on Sep. 22, 2000, 2 pages.
U.S. Office Action dated Jan. 8, 2009 issued in U.S. Appl. No. 10/858,709.
U.S. Office Action dated Jan. 9, 2009 issued in U.S. Appl. No. 09/820,966.
U.S. Office Action dated Mar. 3, 2009 issued in U.S. Appl. No. 09/820,964.
U.S. Examiner's Interview Summary dated Aug. 3, 2005 issued in U.S. Appl. No. 09/820,965.
U.S. Notice of Allowance dated Dec. 18, 2008 issued in U.S. Appl. No. 09/820,965.
U.S. Office Action dated Jan. 22, 2009 issued in U.S. Appl. No. 09/820,965.
U.S. Office Action dated Feb. 3, 2009 issued in U.S. Appl. No. 09/820,965.
U.S. Office Action dated Feb. 12, 2009 issued in U.S. Appl. No. 09/820,965.
U.S. Office Action dated Feb. 25, 2009 issued in U.S. Appl. No. 09/820,965.
U.S. Office Action dated Feb. 2, 2009 issued in U.S. Appl. No. 11/016,566.
U.S. Office Action (Examiner Interview Summary) dated May 11, 09 issued in U.S. Appl. No. 11/012,639.
U.S. Office Action dated May 23, 2008 issued in U.S. Appl. No. 11/014,149.
U.S. Examiner's Interview Summary dated Oct. 8, 2008 issued in U.S. Appl. No. 11/014,149.
U.S. Office Action Final dated Dec. 17, 2008 issued in U.S. Appl. No. 11/014,149.
U.S. Office Action (Examiner Interview Summary) dated Mar. 9, 2009 issued in U.S. Appl. No. 11/014,149.
U.S. Office Action (Advisory Action) dated Mar. 23, 2009 issued in U.S. Appl. No. 11/014,149.
ebXML: Creating a Single Global Electronic Market (2000) OASIS UN CEFACT, copyright ebXML 2000, ebXML Technical Architecture Team, Oct. 17, 2000, 46 pages.
Slam Dunk Networks (2000), Company overview and product guide downloaded from Slamdunknetworks.com website at http://www.slamdunknetworks.com; Retrieved from internet on Sep. 22, 2000, 15 pages.

* cited by examiner

TECHNIQUES FOR PROVIDING INTEROPERABILITY AS A SERVICE

RELATED APPLICATION DATA

The present application is related to U.S. patent application Ser. No. 09/820,964 for SYSTEM AND METHOD FOR MAPPING OF SERVICES filed Mar. 30, 2001, U.S. patent application Ser. No. 09/820,965 for SYSTEM AND METHOD FOR INVOCATION OF SERVICES filed Mar. 30, 2001, U.S. patent application Ser. No. 09/820,966 for SYSTEM AND METHOD FOR ROUTING MESSAGES BETWEEN APPLICATIONS filed Mar. 30, 2001, U.S. patent application Ser. No. 10/727,089 for APPARATUS AND METHODS FOR PROVISIONING SERVICES filed Dec. 2, 2003, U.S. patent application Ser. No. 10/728,356 for APPARATUS AND METHODS FOR CORRELATING MESSAGES SENT BETWEEN SERVICES filed Dec. 3, 2003, and U.S. patent application Ser. No. 10/742,513 for APPARATUS AND METHODS FOR MEDIATING MESSAGES filed Dec. 19, 2003, the entire disclosures of all of which are incorporated herein by reference for all purposes.

BACKGROUND OF THE INVENTION

The present invention relates to techniques for providing interoperability between and among disparate applications and services. More specifically, embodiments of the invention provide and manage highly individualized, on-demand access to applications and services in a network environment.

Corporate reliance on technology has become more complex and pervasive. Increasingly, companies are identifying opportunities to extend their core business or cut costs using the Internet. Both trends have put increasing priority on integrating the operation of disparate business applications that exist in different enterprises. As a result, the enterprise application integration (EAI) and business-to-business B2B industries have emerged to provide solutions for unifying enterprise legacy systems that may span corporate boundaries and may include the applications of business partners and customers. Ideally, this unification does not require sweeping changes to the underlying applications and data structures.

EAI and B2B solution providers typically offer end point solutions for managing business process interactions between end points. This can take place within an enterprise on a local network or, in the case of B2B, across the Internet. Although a specific enterprise software package may be designed to transparently handle diverse business processes carried out by two or more end nodes, each specific enterprise software package requires releasing, implementing or building customized connectors or adapters to connect to different legacy systems which will work for the specific business processes and applications used by the specific end nodes. As a result, these enterprise solutions are not easily scalable. Additionally, scores of adapters are needed for each vendor (e.g., Oracle, SAP and Peoplesoft). As each supplier releases new versions of their software, EAI and B2B vendors find themselves unable to gain traction under the burden of supporting existing adapters.

Notwithstanding the benefits of EAI and B2B solutions, the software costs and resource investments required often prevent small-to-medium enterprise (SME) customers from embracing EAI and B2B solutions. For SMEs, reliance on web services technology providers represents an increasingly attractive alternative.

The application service provider (ASP) market is one of the fastest growing segments of the software industry. ASPs make enterprise applications (e.g., human resources administration, recruiting, travel and expense management, sales force automation) available to customers over the web on a subscription basis. These applications are fully managed and hosted by the provider providing significant cost savings to enterprises and eliminating many of the issues requiring EAI solutions.

Some ASPs merely host and manage third-party packaged software for their customers (i.e., "managed hosters"). Others build new applications from the ground up to take advantage of the benefits and cost-savings of the ASP model. ASPs enjoy the profit margins and operational scalability of consumer Web companies like eBay and Yahoo, while at the same time offering the feature sets of complex enterprise software applications such as PeopleSoft and Siebel.

Although the ASP approach allows a business and its partners to use third party or custom applications, this approach does not allow the configuring and dismantling of complex arrangements between business partners. Specifically, the ASP approach requires custom configurations when business partners use different data formats for their messages or different communications protocols. Using these custom configurations, business partners specify the format of outgoing messages to comport with the recipient's format requirements. These messages can then be delivered to a recipient in a format understandable to the recipient. According to this approach, business entities must keep track of formatting and integration requirements of each of their recipient business partners in order to achieve interoperability. This can be costly and time-consuming.

None of these ad hoc approaches to interoperability can practically provide a single solution for facilitating the consumption of the wide array of disparate services employed by the typical enterprise. Moreover, none of these approaches is well suited to deliver such an array of services in the personalized manner to which so many users of the World Wide Web have become accustomed.

In view of the above, there is a need for facilitating communications between and among diverse business entities, processes, and services in a scalable manner. In addition, there is a need for techniques for mediating such communications in a manner which individualizes each user's experience.

SUMMARY OF THE INVENTION

According to the present invention, techniques are disclosed for providing interoperability between and among disparate platforms, services, or applications as a service. Various embodiments of the invention provide for an interoperability system or network which is operable to facilitate communication among disparate entities including, for example, individual users from one or more enterprises and a wide variety of enterprise applications and services from different service providers. Interoperability networks implemented according to such embodiments provide the mechanisms by which such entities may interact substantially transparently, as well as a policy-based directory capability to facilitate management of the manner in which such entities and their various applications are allowed to interact. As will become clear, the interoperability networks of the invention are capable of interacting with a virtually unlimited variety of computing models and platforms, thus ensuring the efficient and reliable delivery of services irrespective of the manner in which computing and networking technology evolves in the future. In addition, various embodiments of the invention are operable to facilitate the delivery of such services in a highly individualized, on-demand manner.

According to a specific embodiment of the invention, an interoperability system is operable to provide access to a plurality of services by a plurality of users. Each of the plurality of users is associated with one of a plurality of independent enterprises, and the plurality of services are associated with and controlled by a plurality of independent service providers. The plurality of services employ a plurality of interfaces at least some of which are not directly interoperable. At least one data store has a directory stored therein which maps an identity corresponding to each of the users to a policy framework which defines access policies relating to the services. The identity for each user identifies the associated enterprise. The at least one data store also has a plurality of rich client objects stored therein which are operable to be launched within browser environments on the client machines and to interact with the services via the interoperability system. At least one computing device is operable to connect with each of the client machines and each of the interfaces associated with the services, to selectively upload the rich client objects to the client machines with reference to the directory, and to selectively facilitate interaction among the uploaded rich client objects and the services with reference to the directory and the policy framework, thereby enabling the users associated with different ones of the enterprises to independently access the plurality of services using the interoperability system.

According to various specific embodiments, selected ones of the rich client objects are operable to interact with each other on the client machines, thus facilitating the delivery of front end services. The rich client objects may be uploaded during an initial sign-on process initiated by a sign-on request. Rich client objects may also be uploaded in response to a subsequent request for a service subsequent to the sign-on process. Previously installed rich client objects on the client machines may also be employed.

According to various specific embodiments, the interoperability system of the present invention may connect with client machines directly via a public wide area network. Alternatively, the system may connect with client machines via an enterprise network.

According to some embodiments, the interoperability system can facilitate "occasionally connected computing" by allow client machines to retain uploaded rich client objects and other uploaded data when the client machines are not connected to the system. According to one such embodiment, offline data are generated and cached by the rich client objects when the client machines are not connected to the system. The offline data are then received by the system when the client machines reconnect to the system. According to another embodiment, the system generates and caches offline data when the client machines are not connected to the system, and then transmits the offline data to the client machines when they reconnect to the system.

According to further embodiments, the interoperability system is operable to facilitate interaction between two or more of the services, thereby providing access to a composite service.

According to another embodiment, a computer-implemented method provides access to a plurality of services by a plurality of users having associated client machines. Each of the plurality of users is associated with one of a plurality of independent enterprises. The plurality of services is associated with and controlled by a plurality of independent service providers. The services employ a plurality of interfaces at least some of which are not directly interoperable. Rich client objects are selectively transmitted to the client machines. The rich client objects are operable to be launched within browser environments on the client machines and to interact with the services in accordance with a directory which maps an identity corresponding to each of the users to a policy framework which defines access policies relating to the services. The identity for each user identifies the associated enterprise. Interaction among the transmitted rich client objects and the services is selectively facilitated in accordance with the directory and the policy framework, thereby enabling the users associated with different ones of the enterprises to independently access the plurality of services using a single system.

According to another embodiment, an interoperability system and associated methods are provided for providing access to a plurality of services by a plurality of users having associated client machines. Each of the plurality of users is associated with one of a plurality of independent enterprises. The plurality of services are associated with and controlled by a plurality of independent service providers and employ a plurality of interfaces at least some of which are not directly interoperable. The system includes at least one data store having a directory stored therein which maps an identity corresponding to each of the users to a policy framework which defines access policies relating to the services. The identity for each user identifies the associated enterprise and a role associated with the user in the associated enterprise. The system also includes at least one computing device which is operable to connect with each of the client machines and each of the interfaces associated with the services. The at least one computing device selectively facilitates interaction among the client machines and the services with reference to the directory and the policy framework. The at least one computing device also facilitate consumption of the services in a unique manner for each user in accordance with the corresponding identity.

A further understanding of the nature and advantages of the present invention may be realized by reference to the remaining portions of the specification and the drawings.

DETAILED DESCRIPTION OF SPECIFIC EMBODIMENTS

Figure 1A:
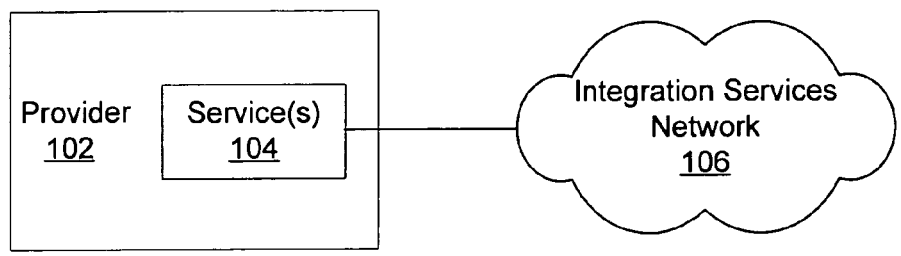
FIG. 1A illustrates the provisioning of a service for use over a network in accordance with one embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features or details may not have been described to avoid unnecessarily obscuring the invention.

According to various embodiments of the invention, an interoperability network is provided which facilitates interoperability using, among other things, a wide variety of web services technologies and standards including, for example, SOAP, Web Services Description Language (WSDL), WS-Security, WS-Policy, and Business Process Execution Language (BPEL). The interoperability network mediates the technology differences in data formats, communications protocols and business policies through a set of established and defined policies.

In general, the term web services refers to a collection of technology standards which enable software applications of all types to communicate over a network. A web service typically facilitates a connection between two applications or services in which queries and responses are exchanged in XML over HTTP (or HTTPS). More specifically, the term web services implies the implementation of a stack of specific, complementary standards.

Although not specifically tied to any transport protocol, web services build on Internet connectivity and infrastructure to ensure nearly universal reach and support. In particular, web services take advantage of HTTP, the same connection protocol used by Web servers and browsers. XML (and it's corresponding semantics) is a widely accepted format for exchanging data. It is a fundamental building block for nearly every other layer in the web services stack. The Simple Object Access Protocol (SOAP) is a protocol for messaging between applications. It is based on XML and uses common Internet transport protocols like HTTP to carry its data. Web Services Description Language (WSDL) is an XML-based description of how to connect to and communicate with a particular web service. A WSDL description abstracts a particular service's various connection and messaging protocols into a high-level bundle and forms a key element of the UDDI directory's service discovery model. Finally, Universal Description, Discovery, and Integration (UDDI) represents a set of protocols and a public directory for the registration and real-time lookup of web services and other business processes. Various embodiments of the invention employ these and similar technologies to provide interoperability between and among disparate platforms, services or applications as a service.

Specific mechanisms by which interoperability networks implemented according to various embodiments of the invention may facilitate interaction among a variety of entities will now be described with reference to the accompanying figures. It will be understood that the mechanisms described are merely examples of techniques which may be employed to facilitate the basic functionalities of such interoperability networks. That is, any technologies which facilitate "on-demand" access to a wide range of services are within the scope of the invention.

FIG. 1A illustrates the provisioning of a service via a network in accordance with one embodiment of the present invention. As shown, the network includes an interoperability network 106 (which may be a portion of an interoperability network designed according to the invention) for facilitating the provisioning of services for use by entities having access to the network. In a specific example, a service (or set of services) 104 is provisioned by a provider 102 in conjunction with interoperability network 106. During the provisioning process, format connection, and security preferences may be specified for messages received by the service 104 as further described below. In one embodiment, provisioning includes setting up a service configuration such that the service may be used in the network. As part of this set up, the service can specify the type of message format that it prefers to receive. In the illustration, service(s) 104 is shown within provider 102, e.g., inside the enterprise firewall. However, it should be understood that service(s) 104 may reside outside the firewall at, for example, a third party site.

In some embodiments, provider 102 may optionally specify which users or services may access the provisioned service 104 and the conditions under which they may have access. It should be recognized that the service 104 can be provided by provider 102 to any type of entity such as, for example, an individual user from a particular organization or a particular organizational entity. An organization may represent a distinct business entity, a particular user of a business entity, or an administrative domain of a computer application.

As used herein, the term "service" may represent any computer application, process, entity, or device accessible to other applications, processes, entities, or devices through an interface such as an application programming interface (API), user interface, or Internet web user interface by any of a variety of protocols over a network within an entity or over the Internet. A service may also comprise multiple methods or applications on a single device or distributed across multiple devices.

Although not shown in FIG. 1A, provider 102 may provision any number and type of services. Also, any number and type of providers may provision services to be accessed through the interoperability network 106. Accordingly, the interoperability network 106 may be configured to provision multiple services from multiple providers. Additional mechanisms and techniques for provisioning services and for enabling disparate entities to interact according to the invention are described in U.S. patent applications Ser. Nos. 09/820,964, 09/820,966, 09/820,965, 10/727,089, 10/728,356 and 10/742,513 incorporated herein by reference above. Any of the mechanisms described in these referenced applications may easily be applied with the techniques described herein.

After services are provisioned, messages may then be sent between two or more services via the interoperability network. That is, a particular service may be accessed by another service via the network. For example, a user associated with a first device may access a particular service on a second device via the interoperability network using a communication process (or service) located on the first device.

Figure 1B:
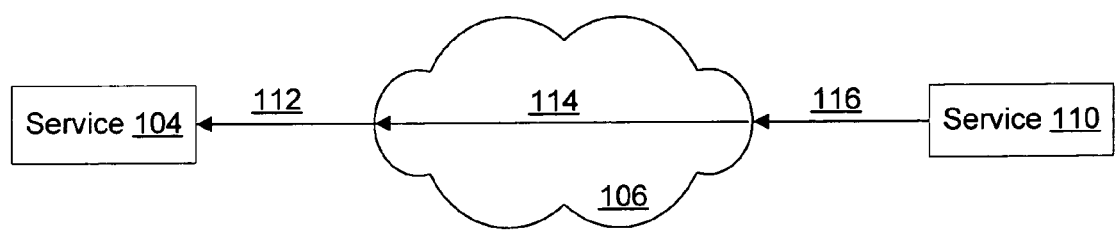
FIG. 1B illustrates the mediation of messages sent from a first service to a second service via an interoperability network in accordance with one embodiment of the present invention.

FIG. 1B illustrates the mediation of messages sent from a first service to a second service via an interoperability network in accordance with a particular embodiment of the present invention. As shown, a message is being sent from service 110 to service 104 through interoperability network 106 which is accessible over a wide area network such as, for example, the Internet. Such a message may correspond to a request from a user associated with service 110 for access to service 104 which resides on a remote device. The request may be sent to the service 104 by a web application (e.g., service 110) located on another remote device. In particular cases, the services may be configured to execute on their own and a user is not required to send a request or message to a particular service.

In one configuration of the present invention, interoperability network 106 includes any number of mechanisms for mediating communications between two or more services. In the illustrated embodiment, interoperability network 106 includes a mechanism for translating messages sent between the services, such as from service 110 to service 104. Messages can use formats such as MIME, DIME, and the like, with AS2, SOAP, and other application bindings. MIME and DIME are attachment/part formats, while SOAP and AS2 are application logic binding protocols. Of course, a message may use any suitable type of protocol, structuring, or formatting specification which results in a particular format for the message. When different entities use different formats for their messages, the interoperability network translate the messages such that recipients receive the messages in the appropriate format.

In an exemplary embodiment, a message having a MIME format is sent by service 110 and received into interoperability network 106 via path 116. Of course, the routing path 116 may include any number and type of routers and/or processing nodes. Interoperability network 106 then determines, e.g., through policies in the directory, that service 104 expects messages to be received in a DIME format and translates the message from MIME to DIME along path 114. The path 114 may include any number and type of routing devices (or services) and/or processing device (or services). The translated message, which is now in DIME format, is then sent to service 104 via path 112 which may include any suitable number and type of routing devices and/or processing nodes.

In addition to this transformation, any number of other enrichments may be applied to messages in the network. Such enrichments may include, for example, a digital signature service, a tariff calculator for a purchase order, etc.

According to various implementations, service 110 and the provider of service 110 need not be aware of the message format requirements of the message destination (service 104), nor of any format translation taking place in the interoperability network. Service 110 may send the message as if service 104 employed the same message format as used by service 110. A more detailed discussion of exemplary processes for mediating messages in different formats is provided below with regard to FIGS. 2 through 6.

In addition to providing mechanisms for provisioning services and mediating messages sent to such services, interoperability network 106 also preferably includes a repository or a directory for storing various information regarding the services and entities which provision and/or use such services. This information may include, for example, user identities, service identities, and policies which control which entities in the network can interact, and the manner in which they can interact. The interoperability network preferably also includes mechanisms for creating and combining services, registering users and their identifying information, and handling messages routed between services and/or users. The repository may be formed from one or more databases or directory services, including LDAP, or the like stored on one or more memory devices on one or more computing platforms.

According to specific embodiments of the invention, the interoperability network provides security management including authentication, authorization and security policy enforcement using the information in the directory and policy framework. The network may perform security management at various points in a message's network lifecycle, e.g., when a message is sent into the network from a service, when it is routed to its destination endpoint, and when the message is delivered out of the network to its destination service. While the following discussion employs the term "service," it will be understood that this is intended to include all software entities capable of connecting to and interacting with the interoperability network.

Authentication is the process of verifying that users or services interacting via the network have valid network identities. The authentication process may also involve the network supplying credentials required by the service to identify the network. Authorization is the process of making sure a service has permission to exchange messages with another service. Security policy enforcement allows services to specify the level of security other services must employ to interact with them via the network. For example, if a first service has a security policy of required encryption for data and required password authorization or better, then only services connecting to the network with a connection security policy that requires at least data encryption will be allowed to exchange messages with the first service. Providers of services can define equivalent security policies, allowing the network to consider certain policies to be equivalent to others, though they are not the same, for the purpose of gaining access to services.

According to a specific embodiment, a service identity is the network service address of the network endpoint the connecting service wants to be associated with. The service proof is the password configured for the associated endpoint. The user identity is a combination of organization and user name. Optionally a service name may be provided with the user identity. The user identity associates the connecting service with the corresponding network user account.

When a service posts a message to the network or polls for a message, the service initiates a connection to the interoperability network. The service is authenticated and associated with an endpoint on the network. The network verifies that the connection security policy of the connecting service is at least as high as the connection security policy defined by the associated endpoint. If the authentication and security policy checks pass for a posted message, the message is accepted into the network and is ready to be routed. Otherwise the message is not accepted and a SOAP fault is returned to the service. If the service is polling for a message and verification succeeds, the message requested by the poll is delivered to the service. If security verification fails, a SOAP fault is returned to the service and the polled for message is not delivered.

When connecting to the network the service supplies a username that identifies the service as an identity on the network. The provided identity associates the connecting service with an endpoint service on the network. In addition, the service supplies a password and/or a client certificate as proof of that identity. In the case of HTTPS connections, the network provides a server certificate that may be used by the service for authentication of the network.

As mentioned above, each service must connect with a security level that is the same or higher than the connection security policy configured for the service's associated endpoint service which may be configured, for example, for HTTP, HTTPS (HTTP with encryption) or HTTPS with certificate-based authentication.

The network determines the endpoint associated with a message and routes the message to a message queue associated with that endpoint. During this routing phase, security policy and permission verification is performed. If the security policy and permission verification passes, the message is routed to the message queue associated with the destination endpoint. If either part of the verification does not pass, the message is not routed and a SOAP fault is returned to the service that originated the message.

Security policies are enforced in a bi-directional manner. That is the security policy of the connecting service's endpoint (i.e., the origin endpoint) and the security policy of the destination service's endpoint (i.e., the destination endpoint) must both be met. For example, if the origin endpoint has a security policy of HTTP, it will allow services that use HTTP or HTTPS to connect. However, the only endpoints the origin endpoint will be allowed to message with are endpoints with a security policy that allows HTTP. That is, endpoints with a security policy of HTTPS or higher will not allow services that connect with HTTP to message with the service associated with them.

Permission enforcement may also performed during the message routing phase. The destination endpoint has a permissions or access control list policy that is stored in the directory that the network references to determine whether or not the origin endpoint is allowed to exchange messages with this destination endpoint.

When a message is pushed by the network to a destination service, the network may perform authentication of the service, may provide authentication credentials to the service, and will enforce the connection security policy configured for the endpoint corresponding to the destination service. If authentication verification and security policy validation succeed, the message is delivered to the destination service. If either security verifications fail, the message is not delivered and a SOAP fault may be returned to the service that originated the message.

When connecting from the network to a destination service, the network may be configured to provide no authentication credentials, to supply a username and/or password, or to authenticate a digital certificate (e.g., a Verisign X.509 certificate) sent by the destination service to the network. In addition, the network may be configured to supply a digital certificate which the destination service can use to authenticate the network.

It will be understood that the foregoing description relating to security management is merely exemplary and that any suitable alternatives for providing any combination of the described functionalities are within the scope of the invention.

Figure 2:
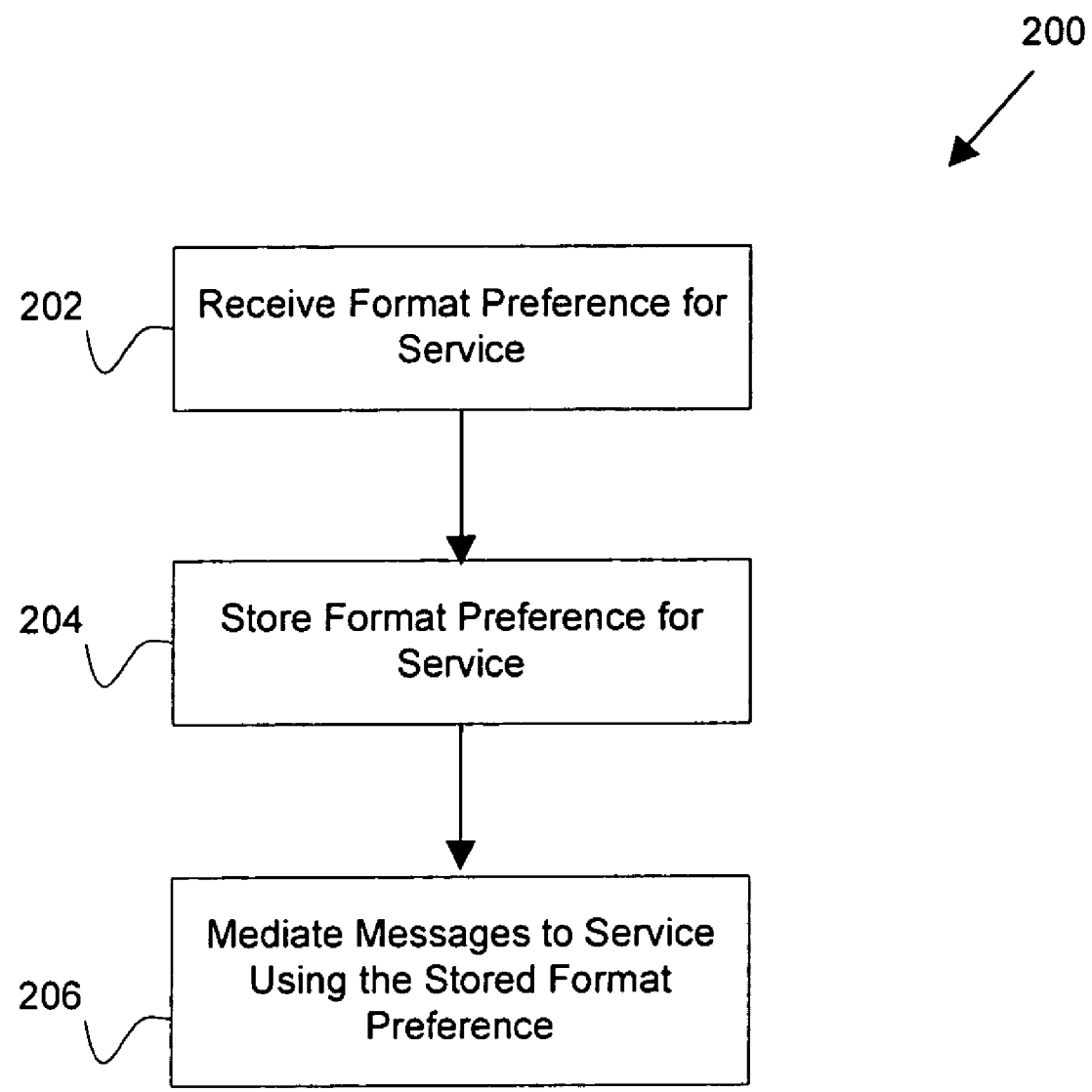
FIG. 2 is a flowchart illustrating a procedure for mediating messages between services in accordance with one embodiment of the present invention.

FIG. 2 is a flow process diagram illustrating one example of a technique for mediating messages sent to a particular service through an interoperability network implemented according to the invention. According to various embodiments, an interoperability network allows communication between services that may use different data formats or protocols. At 202, a format preference for a particular service is received. The format preference may include message format information indicating how messages should be received by that particular service. According to various embodiments, a message may incorporate any of the following format types: Direct Internet Message Encapsulation (DIME), Multipurpose Internet Mail Encapsulation (MIME), Simple Object Access Protocol (SOAP), or AS2, as well as any other protocols or format types.

The format preferences for the first service may be received in a variety of ways. In one example, format preference information is received over a network from a provider provisioning a service with the interoperability network. In the example of FIG. 1A, when provider 102 provisions service 104 with interoperability network 106, provider 102 specifies a format preference for messages received by service 104. According to various embodiments, format information is received when a provider or a service is introduced into the interoperability network. In another embodiment, format information is received when a provider or service is configured for operation with an interoperability network. In a preferred embodiment, a provider specifies only a format preference. The provider does not need to perform any other actions, such as configuring transformation mappings, specifying translation processes, setting up routing to format conversion services, etc.

At 206, the format preference information for the particular service is stored and associated with such particular service. Information can be stored in a variety of ways or in any number and type of storage devices, such as one or more databases, caches, directory services, or any of a variety of data structures. In one implementation, format preference information is stored in an interoperability network database. In another implementation, format preference information is stored at another network entity associated with the interoperability network. In a specific implementation, a format table is used to store entries regarding each service and its associated format preference.

At 208, messages sent to a provisioned service are mediated using the format preference stored for that service. Details of this mediation according to specific embodiments of the invention will now be described with reference to FIGS. 3 through 6.

Figure 3:
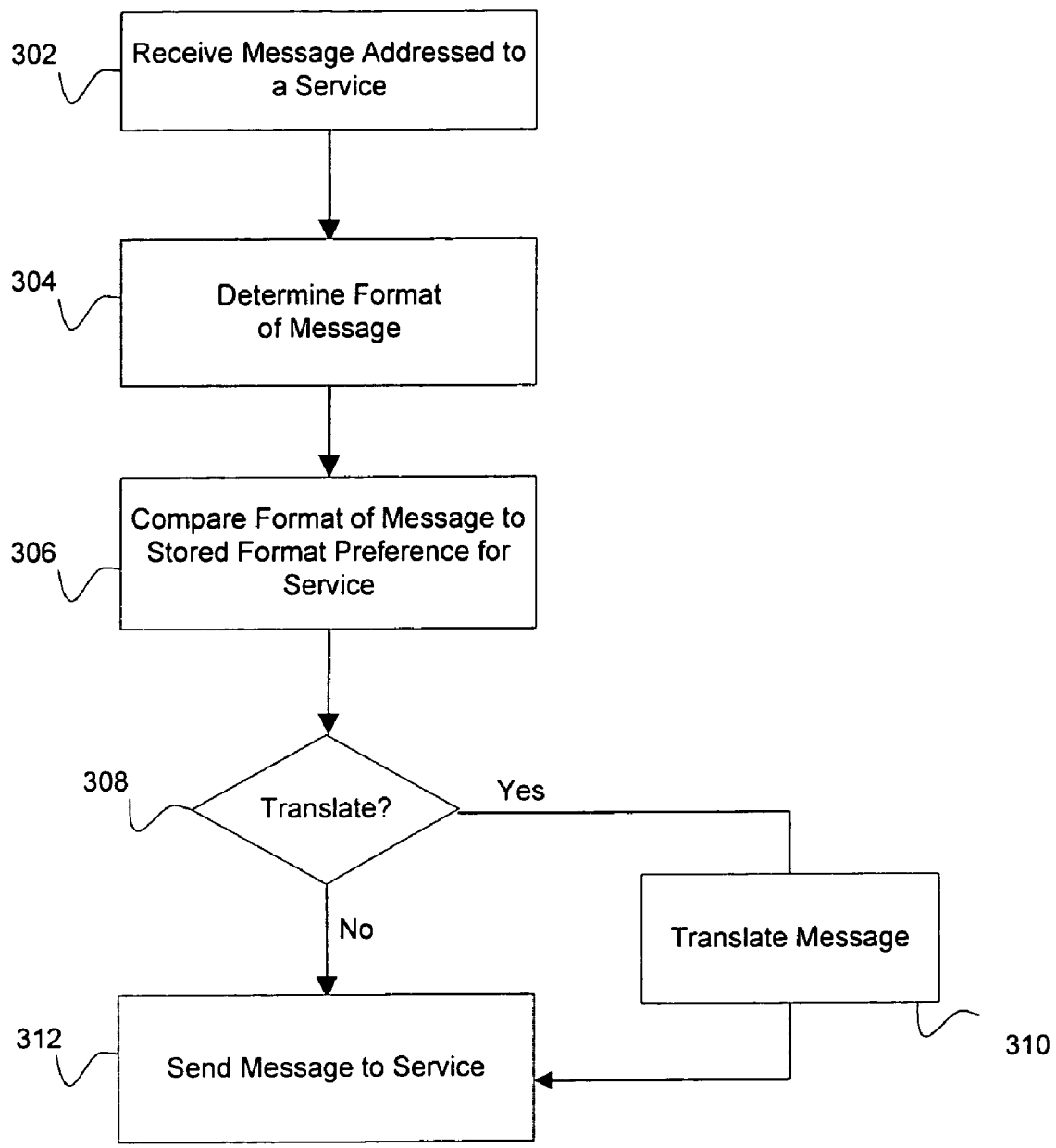
FIG. 3 is a flowchart illustrating a procedure for mediating a message sent to a particular service in accordance with one embodiment of the present invention.

FIG. 3 is a flow process diagram showing one example of a technique for mediating messages sent to a particular service through an interoperability network (e.g., network 106 of FIG. 1). According to various embodiments, messages sent to the particular service may be received into the interoperability network from a variety of different entities including other services, applications, hosts, network storage arrays, or terminals. The messages are sent to the interoperability network over a wide area network such as the Internet.

At 302, the interoperability network receives a message addressed or requesting access to a particular service. In the example of FIG. 1, service 110 sends such a message to the network requesting service 104. According to various embodiments, the message addressed to a particular service may include the particular address associated with the particular service. In other embodiments, the message merely includes some indicator associating the message with the desired service or the provider of the desired service.

At 304, the format of the message is determined. In one example, determining the format may involve scanning the message to determine if formatting mechanisms such as DIME, MIME, SOAP, or AS2 are used. In some examples, multiple formatting mechanisms may be used. In an alternative embodiment, the format of the message may be presumed to be the same as the format preference specified for the sending service. However, a verification of the format is preferably performed by analyzing each message.

At 306, the format of the message is compared to the stored format preference for the requested service (i.e., the receiving service). For example, if the format preference stored for the particular service indicates that the particular service should receive messages with DIME formatting and the message format is MIME, translation may be needed. If it is determined that translation is necessary at 308, the message is translated at 310 and sent to the particular service at 312. If translation is not necessary at 308, the message is forwarded to the particular service at 312.

According to various embodiments, the techniques of the present invention recognize whether translation is necessary without a received message explicitly indicating that a translation is needed. Traditional mechanisms typically involve express requests for translation. In contrast, according to various embodiments of the present invention, a provider of a particular service need only specify the format of messages that the particular service is configured to receive. That is, the formatting used by other services (even services which access the particular service) need not be specified. Techniques of the present invention allow transparent translation of formats without involving user intervention.

Figure 4:
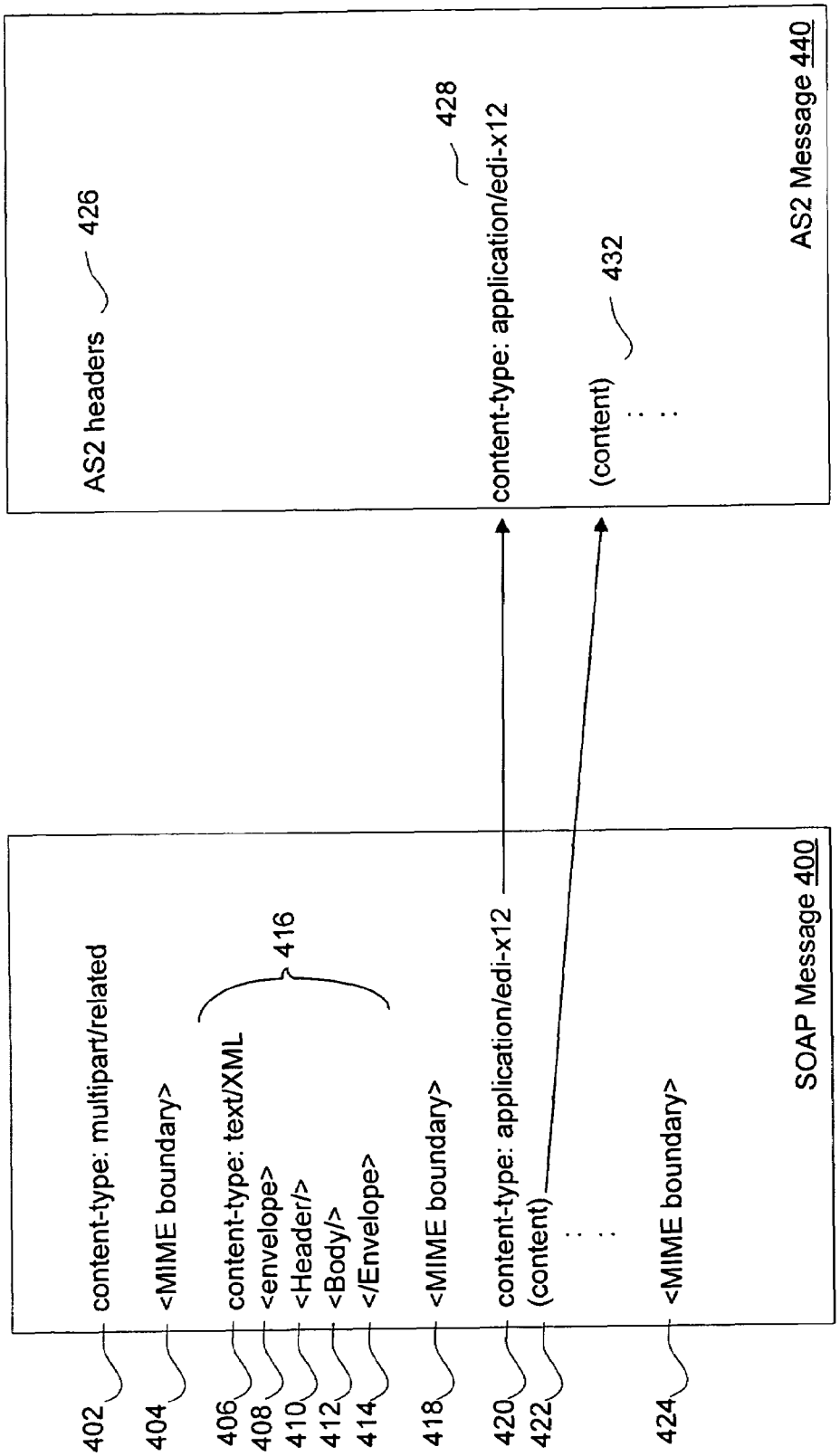
FIG. 4 is diagrammatic representation of a translation of a message from a SOAP format to an AS2 format in accordance with one embodiment of the present invention.

FIG. 4 is diagrammatic representation of a translation of a message from a SOAP format to an AS2 format in accordance with one embodiment of the present invention. The spacing shown for each message type is merely for clarity purposes and is not meant to accurately represent the formatting of actual SOAP and AS2 type messages. As shown, SOAP message 400 includes headers that provide various information such as the format of the message. In particular, content type 402 indicates that the message is multipart/related. Although not shown, other information can be provided in the headers as well. Next, SOAP message 400 includes a MIME boundary 404. Between MIME boundary 404 and 418, a SOAP envelope is included. The content type 406 of this bounded content is indicated as text/XML. The SOAP envelope contains a SOAP header 410 and a SOAP body 412. The content of the SOAP envelope as shown is exemplary only and does not reflect the actual variations and content possible for SOAP envelopes.

The SOAP message 400 further contains a second part between MIME boundaries 418 and 424. The content type 420 of these contents is indicated as application/edi-x12. The content 422 includes an X.12 EDI document. Other MIME headers beyond content type may be present as well. MIME boundary 424 marks the conclusion of these contents and can mark the beginning of another set of contents. Any number of sets of contents separated by MIME boundaries can be included in such a SOAP message 400. Other content types may include other types of text file formats, image file formats, video file formats, audio file formats, executable formats, etc. Alternatively, MIME boundary 424 can be a terminal boundary marking the end of the message.

In the present embodiment, when SOAP message 400 is translated to AS2 message 440, SOAP part 416 is stripped from the message and headers 402 from SOAP message 400 are replaced with AS2 headers 426. In addition, a portion of SOAP message 400 between MIME boundary 418 and 424 is included in AS2 message 440 as follows: content type 420 in SOAP message 400 is included as content type 428 in AS2 message 440, and content 422 in SOAP message 400 is included as content 432 in AS2 message 440.

Various MIME headers associated with the MIME part would also be included in the translated message. If SOAP message 400 contains additional contents (MIME parts) beyond boundary 424, those contents could also be transferred to the AS2 message, in which case the multiple parts of the AS2 message would be separated by MIME boundaries. Alternatively, each of the separate additional MIME parts of the SOAP message could be transformed into additional separate AS2 messages. AS2 message 440 may furthermore contain an added digital signature, in which case the message would contain multiple parts separated by MIME boundaries.

In the present exemplary embodiment, SOAP message 400 is translated to AS2 message 440. It should be recognized that an AS2 message can also be translated to a SOAP message in other embodiments. In such an example, a SOAP part is added to the AS2 message so as to result in a SOAP message. The AS2 headers are replaced by headers appropriate to a SOAP message. The content type and content of the AS2 message is inserted as a MIME part following the SOAP MIME part in the resulting SOAP message. Any suitable number of AS2 message parts may also be combined into a single SOAP message with multiple MIME boundaries. Similarly, any message format can be translated to another message format in accordance with various embodiments of the present invention.

Figure 5:
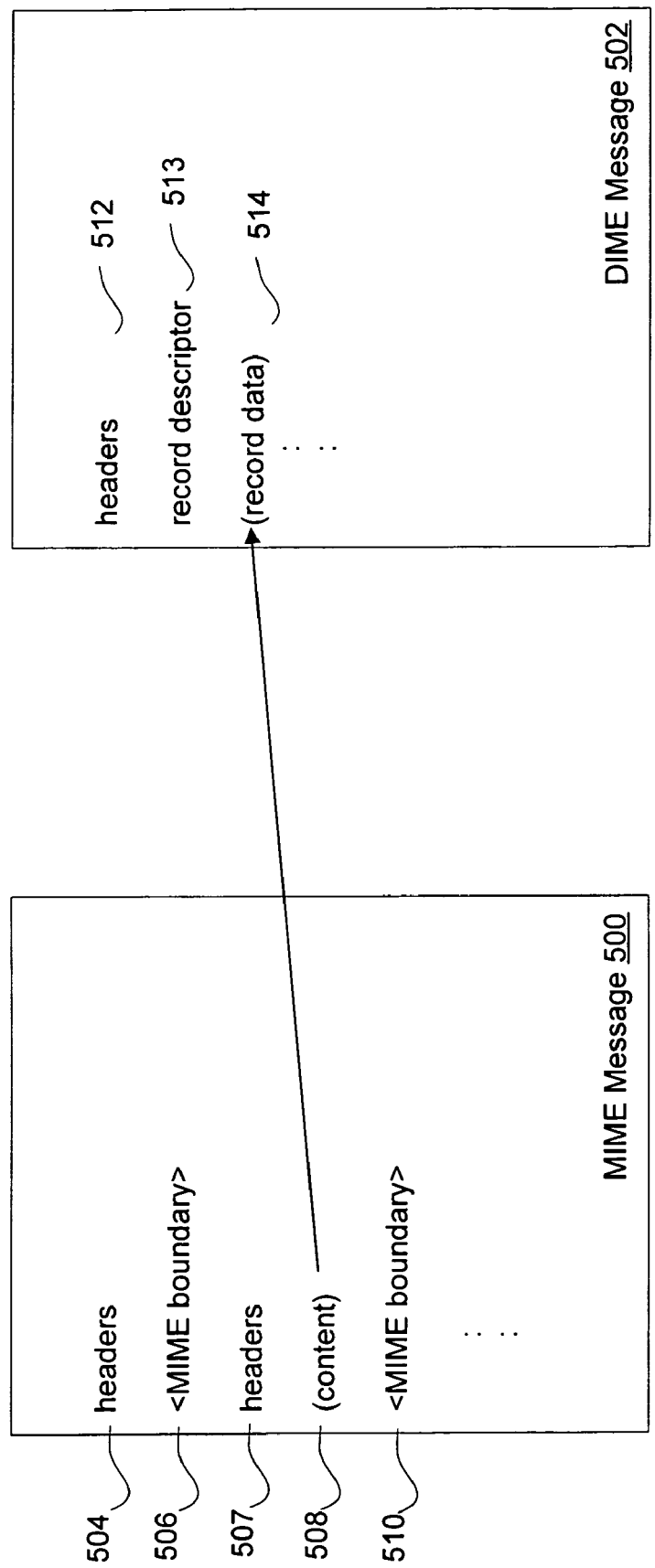
FIG. 5 is diagrammatic representation of a translation of a message from a MIME format to a DIME format in accordance with one embodiment of the present invention.

FIG. 5 is diagrammatic representation of a translation of a message from a MIME format to a DIME format in accordance with another embodiment of the present invention. The spacing shown for each message type is merely for clarity purposes and is not meant to accurately represent the formatting of actual MIME and DIME type messages. As shown, MIME message 500 includes headers 504 and MIME boundaries 506 and 510. Content 508 is located between MIME boundaries 506 and 510. Additional sets of contents and MIME boundaries can be included after MIME boundary 510 according to various embodiments.

In one such embodiment, when the MIME message 500 is translated to DIME message 502, headers 504 from MIME message 500 are translated to headers 512 in DIME message 502. In particular, a content type header in MIME message 500 may have a value of "multipart/related" but will have a value of "application/dime" in DIME message 502. Furthermore, the content type and content id headers 507 in the first MIME part of MIME message 500 are stored inside DIME record descriptor 513 inside DIME message 502. Content 508 of the MIME part is included as DIME record data 514. DIME record descriptor 513 includes information about the length of content 514, so there is no need to include boundaries in a DIME message such as MIME boundaries to determine the beginning and end of a set of contents.

MIME message 500 is parsed to determine the location of MIME boundaries 506 and 510. Once these boundaries are found, content 508 can be included as content 514, and information about the length of content 514, based on the distance between the boundaries or amount of information between the boundaries, can be included in record descriptor 513. Although the present embodiment includes content type and content ID in MIME headers 507, it should be recognized that additional header information can also be included. Such additional header information may also be stored in the DIME message.

Although the present exemplary embodiment includes translating MIME message 500 to DIME message 502, it should be recognized that a DIME message can also be translated into a MIME message. For example, information about the length of record data 514 that is stored in record descriptor 513 can be used to determine the placement of content 508 and MIME boundaries 506 and 510 in a MIME message 500. Similarly, any other message format can be translated to another message format according to various embodiments of the present invention.

Figure 6:
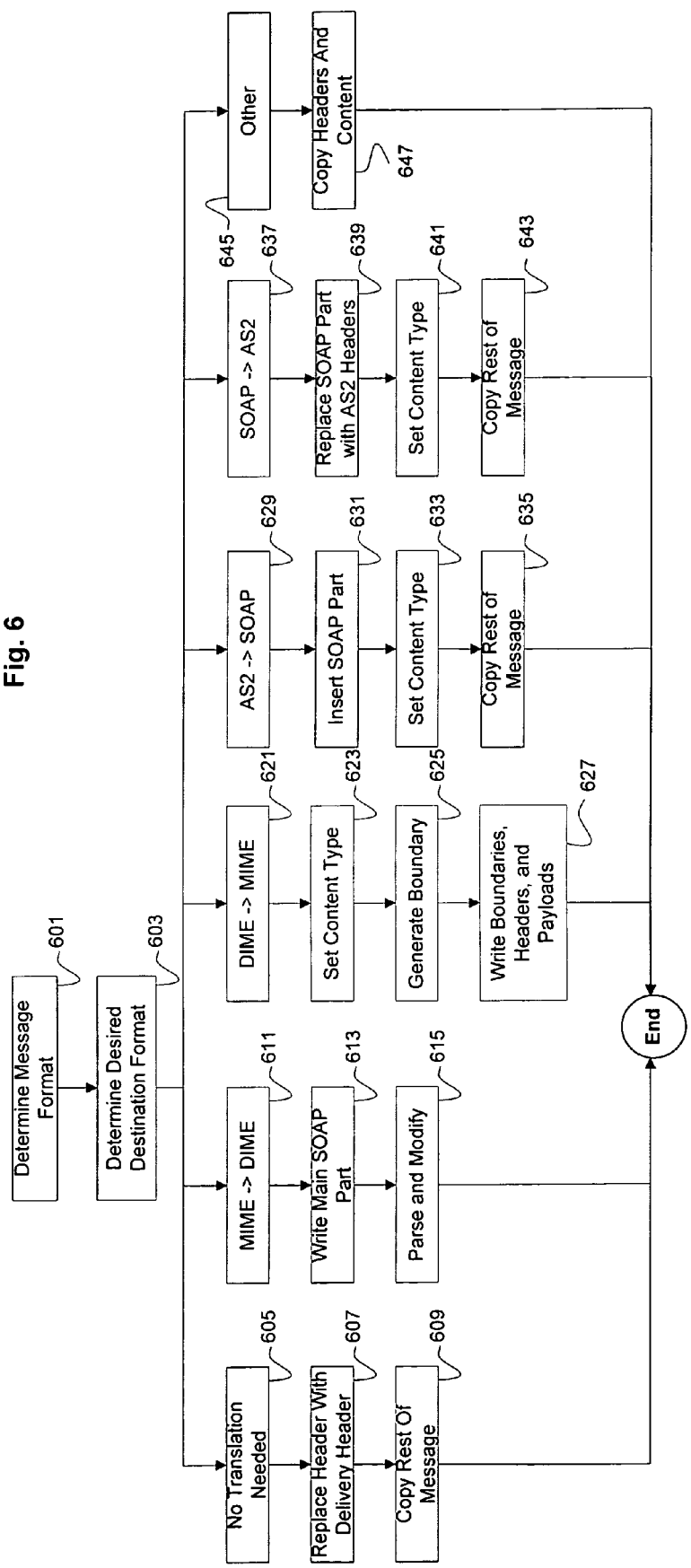
FIG. 6 is diagrammatic representation of a process for translating a message in accordance with one embodiment of the present invention.

FIG. 6 is a flow process diagram depicting one example of a technique for translating between formats. At 601, the message format of the received message is determined. According to various embodiments, the message format can be MIME, DIME, other, or the message can have no attachment formatting. In one example, the format is DIME if the content type is "application/dime" and MIME if the content type is "multipart/*" (where * can be a number of different types). Otherwise, the format may be neither. At 603, the desired format used by the destination service is determined. According to various embodiments, it may be determined that the desired format is the same as the format of the received message at 605. In this case, no translation is necessary, except that some headers or other SOAP parts may be altered and/or replaced at 607 as necessary to reflect an outgoing message from the interoperability network versus a message received into the network. At 609, the remaining message contents can be copied into the outgoing message in an unmodified manner without need for processing.

If it is determined that translation from MIME to DIME is needed at 611, the content type of the message is set to "application/dime." At 613, the main SOAP portion of the message is written as a record with desired content type information. At 615, attachments to the original message are parsed. For each attachment, a new DIME record copying only some MIME headers are written. In one example, Content-ID fields are unchanged when copied to a DIME format and Content-Type fields are also unchanged when copied to a DIME format. The type format field in the DIME record is set to MIME media type.

If the Content-Transfer-Encoding header is set for a MIME part, the content of the MIME part is decoded since DIME does not support transfer encoded record content. The content is then written in the decoded format. Next, if appropriate, the record can be chunked. DIME generally allows for a single part to be written as multiple records. Since DIME records declare their size in the beginning of the record, chunking allows for more optimal transmission of large amounts of data and streaming.

At 621, if it is determined that translation from DIME formatting to MIME formatting is needed, the content type for the new MIME message is set to "multipart/related," with proper boundary attribute, at 623. Next, a boundary for the MIME message to be composed is generated at 625, in order to separate the new MIME parts. For each portion of the message, boundaries, headers, and payloads are written at 627. In particular, each DIME record is parsed and a new MIME part is written for each record. This process involves 1) writing a MIME boundary, 2) writing MIME headers, 3) writing data content, and 4) writing another MIME boundary.

More specifically, once the first MIME boundary is written, the MIME headers are written. If the content-type is a MIME type, the content-type can be copied as-is. If content type is URI, then the content-type can be set to "text/xml." If the content-type is in some other form, then the content-type can be set to "application/octet-stream." In addition, if a content-ID is present, it can be left unchanged in the new message. If the record is not chunked, the content-length can be set to the size of the data record. Otherwise, if the record is chunked, then the content-length header may not be set.

Next, the data content of the record is written. In one example, if the data record is the first record (i.e., SOAP part), then the SOAP part may be parsed to replace SOAP headers used by the interoperability network. After the data content of the record is written, a second MIME boundary is written. If the data record is the last record, the MIME boundary is set as the closing boundary.

Analogous threads for converting AS2 to SOAP (629-635) and SOAP to AS2 (637-643) may also be included.

In the embodiment shown, if it is determined that formatting is not DIME, MIME, AS2, or SOAP at 645, the message headers are copied unchanged at 647. According to various embodiments, the SOAP content is also copied, but the SOAP content is parsed in order to replace SOAP headers used by the interoperability network.

It should be noted that FIG. 6 describes one example of translation mechanisms for very specific formats. A variety of other formats and translation mechanisms are also available. For example, various embodiments of the invention support communication and interoperability with inbound FTP, secure FTP, HTTP, secure HTTP, all web services standards, and a wide variety of legacy applications. Embodiments of the invention also provide a wide variety of connectors to, for example, web portals, application services, desktop applications, handheld devices, and any software designed for web services.

As discussed above, the vast majority of application services today are provided according to a computing model which is characterized by several limitations. According to this model, a user wishing to access any of a number of application services employs a client machine (e.g., a desktop computer) to generate a request for a particular service. This is typically facilitated by a browser operating on client machine. The browser is an application which communicates via a network (e.g., a public or private LAN or WAN) with a server which manages access to the application services. What is typically viewed by the user is a page (e.g., an HTML page) which is generated by the server and delivered over the network for display in the user's browser.

The server in this model typically employs a three-tiered architecture to manage access to the associated application services. A portal layer governs display of information presented in the client's browser. An application server layer manages access to the application services on a high level, but because of the varied nature of the application services, an integration layer is required to normalize the communications with these services. That is, the integration layer, which is the primary focus of EAI providers, facilitates connection with and communication among the application services themselves. Unfortunately, the great variety of application services and the highly individualized nature of EAI solutions coupled with the limitations of this computing model have made EAI an economically impracticable approach for all but the largest enterprises.

By contrast, embodiments of the invention described above with reference to FIGS. 1 through 6 address many of the limitations associated with the paradigm currently dominating the EAI and B2B integration industries by abstracting the integration and interoperability functionalities from the conventional computing model and, instead, providing interoperability between and among disparate platforms, services or applications as a service. As described above, this inventive approach provides an interoperability network having a directory capability which facilitates management of user identities (e.g., including role and group membership), service identities, and policies which control which entities in the network can interact, and the manner in which they can interact. By delivering services according to such an "on demand" model, EAI and B2B are brought within the means of small and medium-sized enterprises.

In addition, embodiments of the invention are contemplated in which each user's experience in the interoperability network is personalized. That is, in addition to mediating the technology and communication protocol issues between disparate platforms and enterprises, embodiments of the invention further leverage evolving computing paradigms in combination with the identity and policy management capabilities of the interoperability network to deliver services to each user in a highly individualized manner. Through the maintenance and management of rich metadata for each user, an interoperability network designed according to the invention may provide, as a service, a personal "portal" through which on-demand access to any service capable of connecting with the network may be provided.

According to various embodiments, many technologies developments may be leveraged to facilitate this unique user experience. For example, computing paradigms have moved increasingly toward the development of an array of software technologies commonly referred to as "rich clients." As used herein, a "rich client" refers to a software application or applet (or a collection of such software objects) which is operable to be launched in a browser on a client machine. A rich client typically includes both the display logic which governs what is displayed on the client machine, as well as some level of application logic (i.e., executable code) which provides functionality on the client machine which, in the past, has typically been provided by code on the remote server. Representative examples of rich client technology are provided by Dream Factory Software, Inc. of Los Gatos, Calif., General Interface Corporation of San Francisco, Calif., Macromedia Inc. of San Francisco, Calif., and Microsoft Corporation (e.g., NET technology, Office suite, etc.).

In view of the foregoing, specific embodiments of the invention take advantage of the development of rich client technology to move further from conventional EAI and B2B paradigms and to provide access to application services in an even more flexible and efficient manner. A particular approach to implementing such an embodiment will now be described with reference to the simplified network diagram of FIG. 7.

As shown in the diagram, the browser on client machine 702 may communicate with interoperability network 704 without requiring an intermediate server. This communication may occur over an intervening network 706 using, for example, a modem (e.g., dial-up, DSL, cable, etc.). Embodiments of the invention are also contemplated in which an intermediate server, e.g., an enterprise's server, is employed to facilitate connection with network 704.

Interoperability network 704 (e.g., using one or more computing devices such as server 707) facilitates access to selected ones of associated services 708 which may be sponsored or provided by network 704, or may comprise application services from third parties. These services may actually reside in the network or be connected via intervening networks (e.g., 709). As mentioned above, network 704 provides transparent connections to and interoperability with a wide variety of services and applications. And like previously described embodiments, interoperability network 704 has a directory capability which facilitates management of user identities (e.g., including role and group membership), application service identities, and policies which control which entities in the network can interact, and the manner in which they can interact.

According to specific embodiments, the interoperability network employs the directory to manage interactions among the services associated with many independent organizations, each with different access, authentication and encryption technologies. Differences in organizational security policies are handled using a policy framework which mediates the differences. According to some embodiments, each organization is able to configure and enforce access rights with multiple methods of authentication being supported.

According to a specific embodiment, an interoperability network implemented according to the invention supports WS-Policy, a flexible mechanism which enables enterprises to govern access to the services they have deployed on the interoperability network. Such a mechanism may be employed, for example, to ensure that data are exchanged over encrypted connections to the interoperability network, that user and service identities are verified (using the directory), and that access to a particular service is limited and controlled. According to even more specific embodiments, such capabilities are supported using industry standards such as, for example, SSL, IPSEC VPNs, and X.509 digital certificates.

Referring back to FIG. 7, communication between interoperability network 704 and client machine 702 may be facilitated through the use of rich client technology. According to some of these embodiments, interoperability network 704 facilitates the transfer of rich client "widgets" 710 to client machine 702 in accordance with the access privileges corresponding to that client. As used herein, the term "widget" refers to one or more software objects which, when instantiated on a client machine, implements all or a portion of a rich client. One of the advantages associated with modern rich client technology is that they are all largely based on the same set of standards and protocols. Therefore, supporting the wide variety of available rich client technology presents a lesser technical challenge than the problem of integrating the widely disparate back end application services. As noted above, representative examples of rich client technology which may be employed with various embodiments of the invention are provided by Dream Factory Software, Inc. of Los Gatos, Calif., General Interface Corporation of San Francisco, Calif., Macromedia Inc. of San Francisco, Calif., and Microsoft Corporation (e.g., .NET technology, Office suite, etc.).

Interoperability network 704 either stores widgets 710 within the network (e.g., in data store 712), or has access to a store of widgets at some remote location(s). In any case, using the directory capabilities of the present invention, interoperability network 704 verifies the identity of the user and determines (with reference to that identity) which of the widgets are to be transferred to client machine 702. According to a specific embodiment, at least some of the widgets to which the client machine is entitled access are transferred to the client machine during an initial "single sign-on" session. Additional widgets may be transferred at run time as the user requests access to additional services. According to still more specific embodiments, some widgets or rich clients may already be installed and running on the client machine prior to the user signing on to the interoperability network. In any case, the widget or widgets dynamically instantiate within the client's browser and the resulting rich client(s) communicate with the specific services the user is entitled to use via interoperability network 704.

Notwithstanding the foregoing references to rich client technology, it should be understood that such technology is merely referred to herein for exemplary purposes and should not be considered to limit the scope of the invention. That is, any technologies (e.g., "thick" or "thin" clients) which can facilitate the highly individualized user experience described herein is within the scope of the invention. For example, templatized HTML pages delivered from the network according to a conventional client-server model may incorporate personalized views which achieve this end. In addition, client-side applications which do not fall within the conventional understanding of the term "rich client" may also be employed to personalize the consumption of services via an interoperability network designed according to the invention.

The approach described above with reference to FIG. 7 represents a significant shift from the approach in which the client machine interacts with the services network via an intermediate server (e.g., the application server on the enterprise's LAN). That is, according to these embodiments, the client machine interacts with the network in much the same way as any of the services or applications which interact with the network. And because the client machine represents an individual user, the delivery of services via the services network is fundamentally changed.

For example, using such an approach, in one browser window, the user may be interacting directly with a particular service, and in another with a complex process created within the services network involving multiple services. Because of the rich client capability on the client's machine which typically employ open standard APIs, the service in one window can interact with the process or services in the other. Thus, in addition to the back-end integration provided within the interoperability network (e.g., the composite services), embodiments of the present invention also enable sophisticated interaction on the user's machine (i.e., front end integration).

In a service oriented architecture, there is also a decoupling of the software development processes from a front consumption standpoint and the back end service definition in the system. That is, development of applications at the back end is traditionally a relatively slow moving process which relates to the development of application programming interfaces (e.g., services) for delivering a variety of desired functionalities. By contrast, the rate of innovation at the client side (which typically relates to how information is displayed) occurs much faster. And because it is the identity of the user, their role and group membership, which governs access to services, and because there is no requirement for an intervening portal, it is largely irrelevant what type of client technology is employed by the user's machine. That is, client technology (rich and otherwise) from any of a wide variety of providers (e.g., Dream Factory, General Interface, Macromedia, Microsoft, etc.) can be used to interact with the interoperability network of the present invention in a manner which is decoupled from the rate at which the application services evolve.

Figure 7:
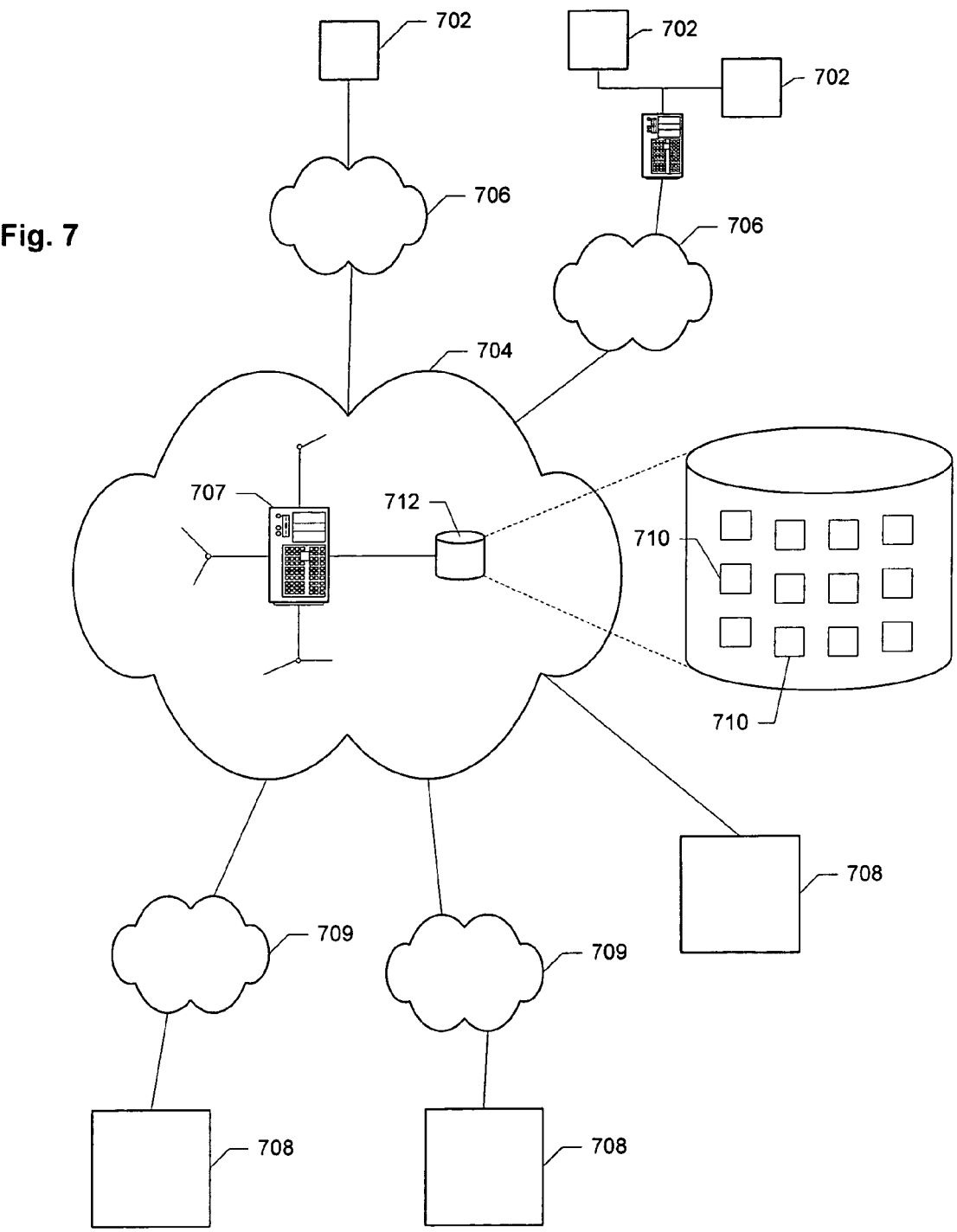
FIG. 7 is a simplified diagram of a network environment in which specific embodiments of the invention may be implemented.

It should be understood that the embodiment of FIG. 7 could be employed in a context where client machine 702 is behind the firewall of an enterprise network which has its own systems in place for managing user identity, security, access, etc. In such an embodiment, the enterprise network would send a security assertion (e.g., in SAML) to the interoperability network for one of its users requesting access to services associated with the interoperability network. And based on the credentials being asserted, the individual's access to the widgets and services on the network will be determined.

However, it should also be understood that according to some embodiments, a company can implement a virtual enterprise network which requires only that its employees have some kind of computing device (e.g., personal computer, personal digital assistant, wireless device, etc.) and a connection to the Internet (e.g., wired or wireless modem, etc.). The remaining enterprise network infrastructure and functionality may be provided by interoperability network 704 through the use of rich client technology which is deployed from network 704. The advantages of such an approach for both large and small enterprises are manifest, allowing sophisticated enterprise network functionality to be enjoyed by even the smallest of enterprises. Simply put, according to the invention, an interoperability network designed according to the invention has the potential for allowing an enterprise to outsource much (if not all) of this functionality to facilitate consumption of a wide range of services in an "on demand" manner.

Another advantage associated with the use of rich client technology in conjunction with the integration service network of the present invention is the potential for dramatically reducing network traffic, and therefore scaling to a large number of users. That is, under conventional computing paradigms, the vast majority of traffic in the network involves the transmission of redundant information, e.g., display refreshes, rather than critical information, i.e., system-of-record transactions. By contrast, according to specific embodiments of the invention, once the rich clients are operational on the client machines, a very high percentage of the network traffic relates to system-of-record transactions because things like display processing are being taken care of on the client machines themselves. This dramatic reduction in traffic corresponds to an equally dramatic potential for scaling the interoperability network.

Yet another advantage of the use of rich client technology in this context is that it facilitates so called "occasionally connected computing." Because of the high processing power of today's PCs and other mobile technology, and because of the capabilities of the many varieties of rich clients, a user can potentially continue to work even when not connected to the interoperability network. That is, he can connect with his enterprise via the interoperability network using any Internet connection, download any data and widgets required to access or take advantage of a given service, then disconnect and (assuming the stored policies corresponding to his identity allow him to do so) retain the widgets and/or data on his machine for working offline.

According to one such embodiment, information generated during such an offline work session is cached for transmission to the interoperability network (or the enterprise via the interoperability network) when the user logs back on. This cache or queue can be thought of conceptually as an "out box" on the user's machine which synchronizes with the network each time the user signs on to the network or affirmatively requests synchronization.

Similarly, an "in box" queue may be maintained in the interoperability network with information relevant to the user which is generated while the user is offline. For example, when an event occurs in the enterprise for which the user typically gets a notification, the notification can be stored in the user's in box until the user logs into the system or affirmatively requests the contents of the queue.

Figure 8:
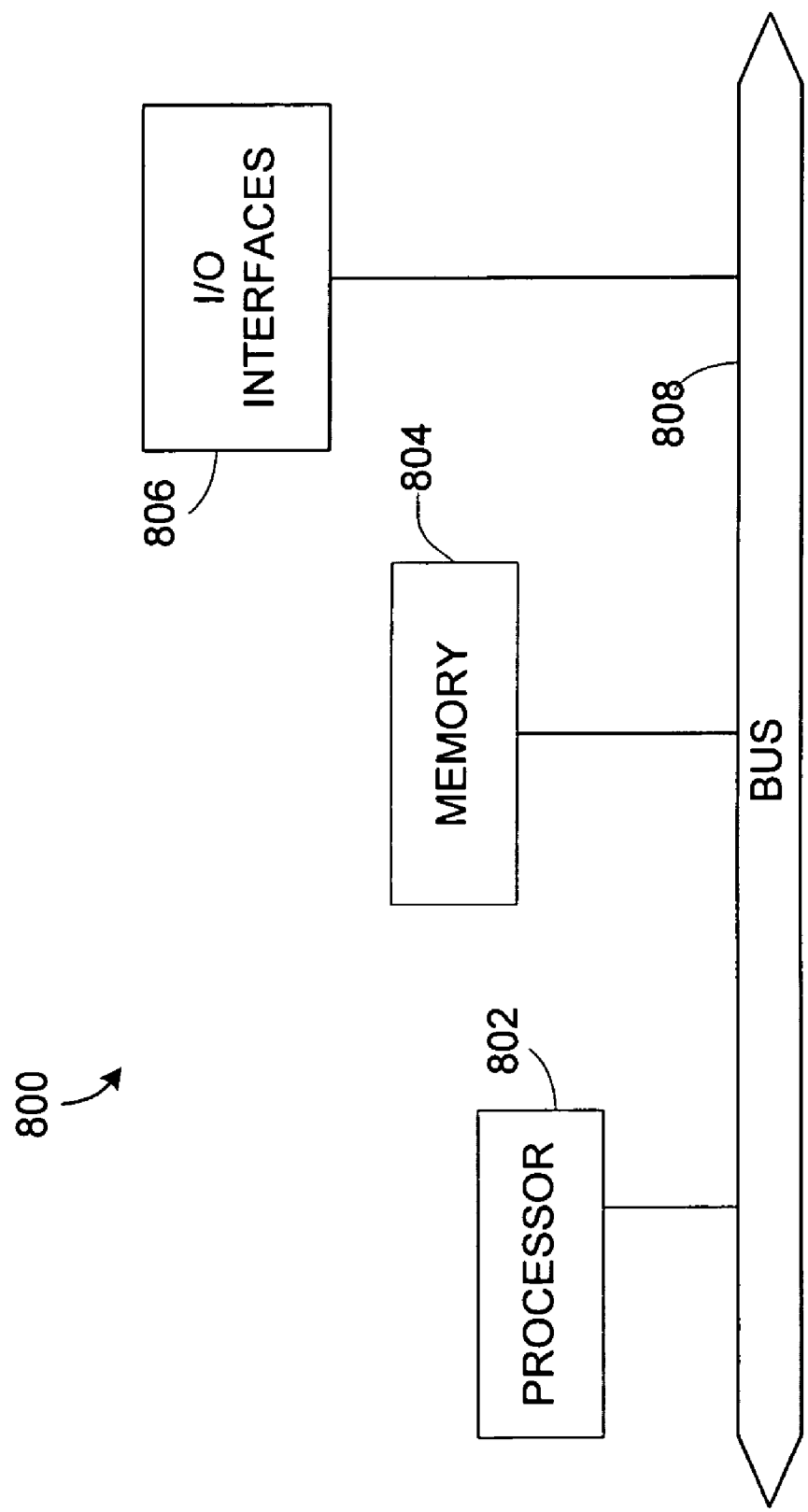
FIG. 8 is a diagrammatic representation of an exemplary computing device which may be employed to implement aspects of various embodiments of the present invention.

Referring now to FIG. 8, a computer system 800 suitable for implementing various aspects of the present invention (e.g., client 702 and/or server 707 of FIG. 7) is depicted. For example, one or more such computer systems may be employed in an interoperability network to manage the deployment of rich clients and/or the delivery of HTML to client computers. Computer system 800 includes one or more central processing units (CPUs) 802, one or more blocks of memory 804, input and output interfaces 806, and a bus 808 (e.g., a PCI bus). Alternatively, computer systems employing point-to-point infrastructures instead of buses may also be employed. When acting under the control of appropriate software or firmware, CPU 802 is responsible for implementing various portions of the techniques of the present invention. It preferably accomplishes all these functions under the control of software including an operating system and any appropriate applications software. CPU 802 may include one or more processors. In a specific embodiment, some portion of memory 804 (such as non-volatile RAM and/or ROM) also forms part of CPU 802. However, there are many different ways in which memory could be coupled to the system.

Memory block 804 may be used for a variety of purposes such as, for example, caching and/or storing data, program code, etc.

The input and output interfaces 806 typically provide an interface to various I/O devices, such as mouse, keyboard, display, as well as providing a communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

It will be understood that the system shown in FIG. 8 is an exemplary computer system and is by no means the only system architecture on which the various aspects of the present invention can be implemented.

Regardless of system's configuration, it may employ one or more memories or memory modules (such as, for example, memory block 804) configured to store data, program instructions for the general-purpose network operations and/or the inventive techniques described herein. The program instructions may control the operation of an operating system and/or one or more applications, for example. The memory or memories may also be configured to store information in a repository directory.

Because such information and program instructions may be employed to implement the systems/methods described herein, the present invention also relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, there are many different network topologies which may be employed to implement an interoperability network having some or all of the functionalities described herein. In addition, such a network may be deployed on the World Wide Web, some other portion of the Internet, or in some alternative network and remain within the scope of the invention. That is, any type of network or system which enables users and services from different enterprises and service providers to interact in the manner described is within the scope of the invention.

In addition, although embodiments have been described herein with reference to the use of rich client technology, it will be understood that this is merely a subset of the technologies which are operable to facilitate the basic functionalities of the present invention. That is, any technologies which can facilitate the highly individualized, on-demand consumption of services as described herein are within the scope of the invention.

Moreover, as described herein, the types of services which may be consumed using the various embodiments of the invention are quite diverse and are not limited by the references herein to particular examples of such services. For example, embodiments have been described herein which refer to web services and the various languages and protocols associated with web services. However, as noted above, the notion of a service is a much broader concept and should not be limited by such references.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An interoperability system for providing access to a plurality of services by a plurality of users having associated client machines, each of the plurality of users being associated with one of a plurality of independent enterprises, the plurality of services being associated with and controlled by a plurality of independent service providers and employing a plurality of interfaces at least some of which are not directly interoperable, the system comprising:

at least one data store having a directory stored therein which maps an identity corresponding to each of the users to a policy framework which defines access policies relating to the services, the identity for each user identifying the associated enterprise, the at least one data store also having a plurality of rich client objects stored therein which are operable to be launched within browser environments on the client machines, and to interact with the services via the interoperability system; and at least one computing device which is operable to connect with each of the client machines and each of the interfaces associated with the services, to selectively upload the rich client objects to the client machines with reference to the directory, and to selectively facilitate interaction among the uploaded rich client objects and the services with reference to the directory and the policy framework, thereby enabling the users associated with different ones of the enterprises to independently access the plurality of services using the interoperability system.

2. The system of claim 1 wherein the at least one computing device is operable to connect with a first one of the client machines in response to a sign-on request.

3. The system of claim 2 wherein the at least one computing device is operable to upload at least one of the rich client objects during a sign-on process initiated by the sign-on request.

4. The system of claim 2 wherein the at least one computing device is operable to upload at least one of the rich client objects in response to a subsequent request for a corresponding one of the services subsequent to the sign-on process.

5. The system of claim 1 wherein the at least one computing device is operable using the policy framework to allow selected ones of the client machines to retain selected ones of the uploaded rich client objects and other uploaded data when the selected client machines are not connected to the system.

6. The system of claim 5 wherein the at least one computing device is operable to receive offline data generated and cached by the selected uploaded rich client objects when the selected client machines are not connected to the system, the offline data being received by the at least one computing device when the selected client machines reconnect to the system.

7. The system of claim 5 wherein the at least one computing device is operable to generate and cache offline data relating to the selected client machines when the selected client machines are not connected to the system, the at least one computing device further being operable to transmit the offline data to the selected client machines when the selected client machines reconnect to the system.

8. The system of claim 1 wherein the at least one computing device is further operable to facilitate consumption of the services in a unique manner for each user in accordance with the corresponding identity.

9. The system of claim 8 wherein the at least one computing device is operable to receive offline data generated and cached by selected client machines when the selected client machines are not connected to the system, the offline data being received by the at least one computing device when the selected client machines reconnect to the system.

10. The system of claim 8 wherein the at least one computing device is operable to generate and cache offline data relating to selected client machines when the selected client machines are not connected to the system, the at least one computing device further being operable to transmit the offline data to the selected client machines when the selected client machines reconnect to the system.

11. The system of claim 1 wherein selected ones of the rich client objects are operable to interact with each other on the client machines.

12. The system of claim 1 wherein the at least one computing device is operable to facilitate interaction with the services using previously installed rich client objects on the client machines.

13. The system of claim 1 wherein the at least one computing device is operable to configure the policy framework for a particular one of the services in response to input received from the service provider of the particular service.

14. The system of claim 1 wherein the at least one computing device is operable to configure the policy framework for at least one of the users in response to input received from an authorized representative of the enterprise associated with the at least one user.

15. The system of claim 1 wherein the policy framework specifies any of access, authentication, and encryption policies for each of the services.

16. The system of claim 1 wherein each user identity includes any of the enterprise associated with the user, a role within the enterprise associated with the user, and an identifier of the client machine associated with the user.

17. The system of claim 1 wherein the at least one computing device is operable to connect with each of the client machines using any of HTTP, HTTPS, FTP, Secure FTP, EDI, INT, AS2, SMTP, and SOAP.

18. The system of claim 1 wherein the at least one computing device is operable to connect with each of the interfaces using any of HTTP, HTTPS, FTP, Secure FTP, EDI, INT, AS2, SMTP, and SOAP.

19. The system of claim 1 wherein the at least one computing device is operable to connect with selected ones of the client machines directly via a public wide area network.

20. The system of claim 1 wherein the at least one computing device is operable to connect with selected ones of the client machines via an enterprise network associated with the enterprise associated with the users corresponding to the selected client machines.

21. The system of claim 1 wherein selective facilitation of the interaction includes facilitation of interaction between two or more of the services, thereby providing access to a composite service by at least some of the users.

22. A computer-implemented method for providing access to a plurality of services by a plurality of users having associated client machines, each of the plurality of users being associated with one of a plurality of independent enterprises, the plurality of services being associated with and controlled by a plurality of independent service providers and employing a plurality of interfaces at least some of which are not directly interoperable, the method comprising:

selectively transmitting rich client objects to the client machines, the rich client objects being operable to be launched within browser environments on the client machines, and to interact with the services in accordance with a directory which maps an identity corresponding to each of the users to a policy framework which defines access policies relating to the services, the identity for each user identifying the associated enterprise; and selectively facilitating interaction among the transmitted rich client objects and the services in accordance with the directory and the policy framework, thereby enabling the users associated with different ones of the enterprises to independently access the plurality of services using a single system.

23. The method of claim 22 farther comprising establishing a connection with a first one of the client machines in response to a sign-on request.

24. The method of claim 23 farther comprising transmitting at least one of the rich client objects during a sign-on process initiated by the sign-on request.

25. The method of claim 23 farther comprising transmitting at least one of the rich client objects to the first client machine in response to a subsequent request for a corresponding one of the services subsequent to the sign-on process.

26. The method of claim 22 farther comprising, in accordance with the policy framework, allowing selected ones of the client machines to retain selected ones of the uploaded rich client objects and other uploaded data when the selected client machines are not connected to the system.

27. The method of claim 26 farther comprising, when the selected client machines reconnect to the system, transmitting offline data generated and cached by the selected uploaded rich client objects when the selected client machines are not connected to the system.

28. The method of claim 26 further comprising transmitting offline data relating to the selected client machines to the selected client machines when the selected client machines reconnect to the system, the offline data being generated and cached when the selected client machines are not connected to the system.

29. The method of claim 22 further comprising facilitating consumption of the services in a unique manner for each user in accordance with the corresponding identity.

30. The method of claim 29 further comprising receiving offline data generated and cached by selected client machines when reconnecting with the selected client machines.

31. The method of claim 29 further comprising generating and caching offline data relating to selected client machines, and transmitting the offline data to the selected client machines when reconnecting with the selected client machines.

32. The method of claim 22 wherein selected ones of the rich client objects are operable to interact with each other on the client machines.

33. The method of claim 22 further comprising facilitating the interaction with the services using previously installed rich client objects on the client machines.

34. The method of claim 22 further comprising configuring the policy framework for a particular one of the services in response to input received from the service provider of the particular service.

35. The method of claim 22 further comprising configuring the policy framework for at least one of the users in response to input received from an authorized representative of the enterprise associated with the at least one user.

36. The method of claim 22 wherein the policy framework specifies any of access, authentication, and encryption technologies for each of the services.

37. The method of claim 22 wherein each user identity includes any of the enterprise associated with the user, a role within the enterprise associated with the user, and an identifier of the client machine associated with the user.

38. The method of claim 22 further comprising connecting with each of the client machines using any of HTTP, HTTPS, FTP, Secure FTP, EDI, INT, AS2, SMTP, and SOAP.

39. The method of claim 22 further comprising connecting with each of the interfaces using any of HTTP, HTTPS, FTP, Secure FTP, EDI, INT, AS2, SMTP, and SOAP.

40. The method of claim 22 further comprising connecting with selected ones of the client machines directly via a public wide area network.

41. The method of claim 22 further comprising connecting with selected ones of the client machines via an enterprise network associated with the enterprise associated with the users corresponding to the selected client machines.

42. The method of claim 22 wherein selectively facilitating the interaction includes facilitating interaction between two or more of the services, thereby providing access to a composite service by at least some of the users.

* * * * *

UNITED STATES PATENT AND TRADEMARK OFFICE
CERTIFICATE OF CORRECTION

PATENT NO. : 7,590,685 B2  Page 1 of 1
APPLICATION NO. : 10/820650
DATED : September 15, 2009
INVENTOR(S) : Ron Palmeri et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 965 days.

should read (*) Notice: Subject to any disclaimer, the term of this patent is extended or adjusted under 35 U.S.C. 154(b) by 1,427 days.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,590,685 B2                                          Page 1 of 1
APPLICATION NO. : 10/820650
DATED            : September 15, 2009
INVENTOR(S)      : Palmeri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1889 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,590,685 B2  Page 1 of 1
APPLICATION NO. : 10/820650
DATED : September 15, 2009
INVENTOR(S) : Ron Palmeri et al.

It is certified that error appears in the above-identified patent and that said Letters Patent is hereby corrected as shown below:

(column 22, line 30) change "farther" to --further--.

(column 22, line 33) change "farther" to --further--.

(column 22, line 36) change "farther" to --further--.

(column 22, line 40) change "farther" to --further--.

(column 22, line 45) change "farther" to --further--.

Signed and Sealed this
Fifteenth Day of February, 2011

David J. Kappos
*Director of the United States Patent and Trademark Office*